July 22, 1958     G. A. LYON     2,844,115
APPARATUS FOR MAKING WHEEL COVERS
Original Filed Dec. 18, 1947     2 Sheets-Sheet 1
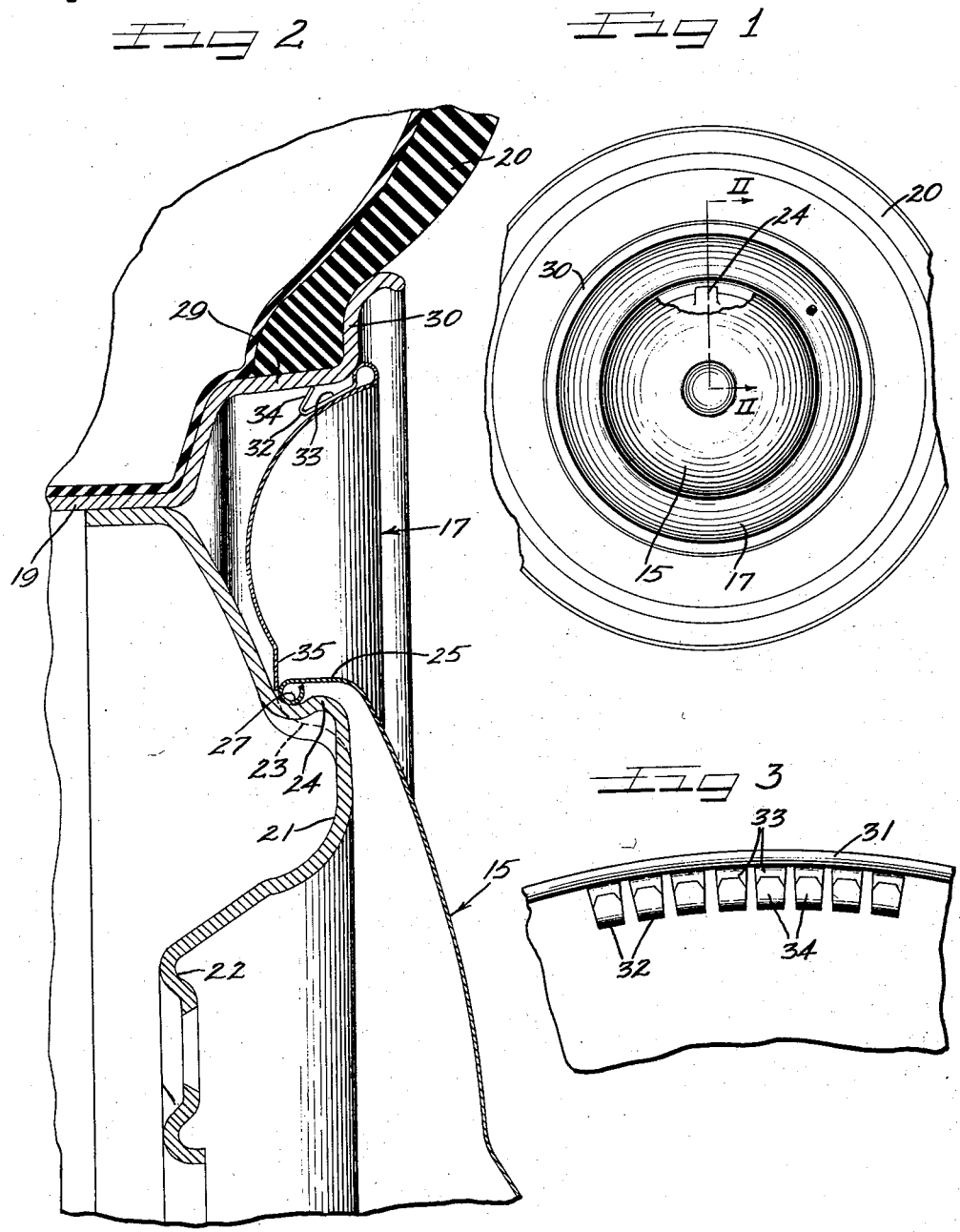
Inventor
George Albert Lyon

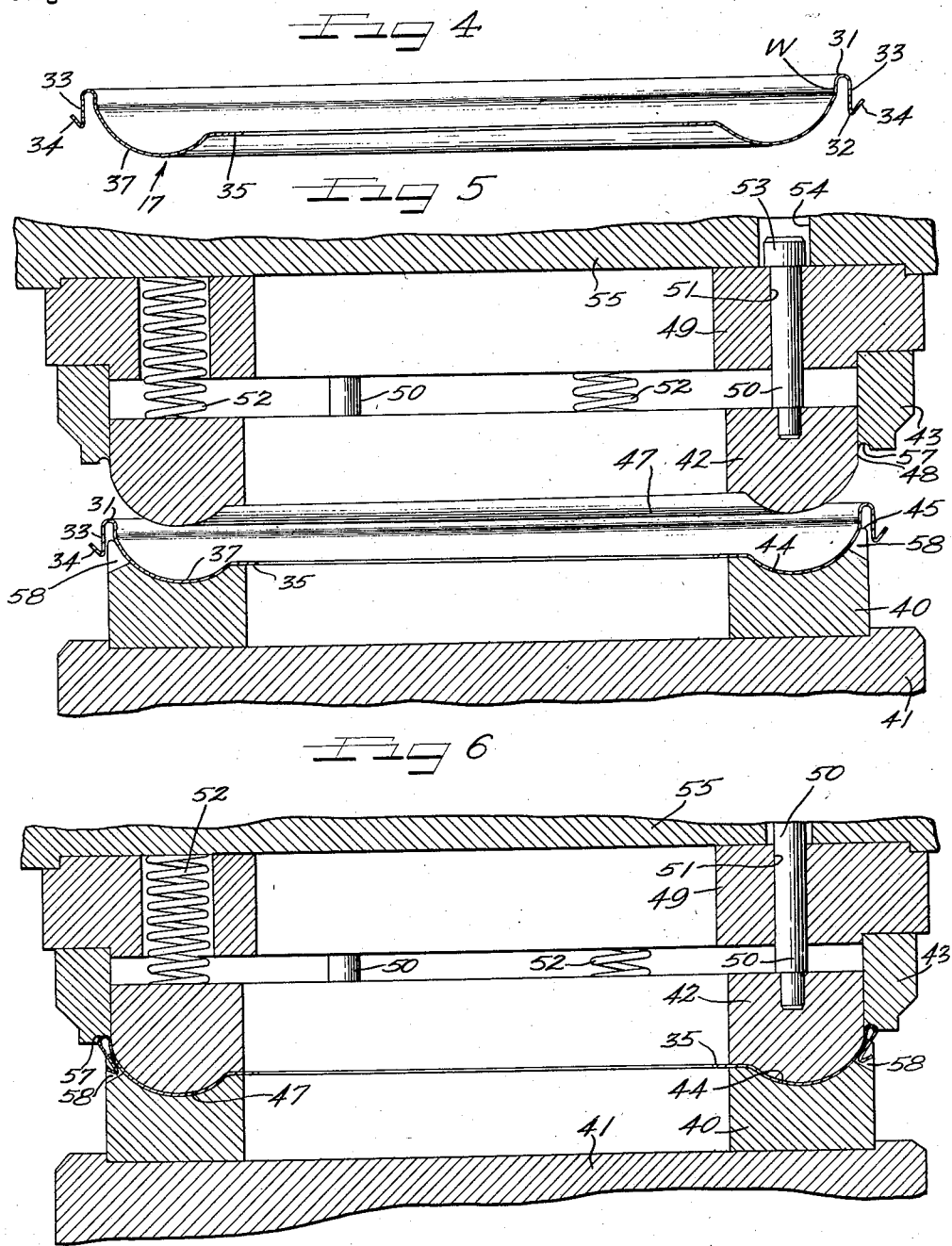

United States Patent Office 2,844,115
Patented July 22, 1958

2,844,115
APPARATUS FOR MAKING WHEEL COVERS
George Albert Lyon, Detroit, Mich.

Original application December 18, 1947, Serial No. 792,511. Divided and this application July 17, 1953, Serial No. 368,735

2 Claims. (Cl. 113—49)

The present application is a division of Lyon application Serial No. 792,511, filed December 18, 1847, now abandoned.

This invention relates to improvements in apparatus for making wheel covers and more particularly covers of the type which are adapted to be mounted on the outer side of automobile wheels for protective and decorative purposes.

An important object of the present invention is to improve the manufacture of automobile wheel covers of the type wherein separate trim ring and hub cap members are assembled upon a wheel to provide a composite, attractive cover.

Another object of the invention resides in the provision of improved apparatus for making a wheel cover component, and more especially a trim ring wheel cover component.

Another feature of the invention resides in forming the outer margin of a trim ring with groups of retaining finger projections bent into concealing relation behind the trim ring.

According to other general features of the invention, there is provided apparatus for beading the outer margin of a vehicle wheel cover member and simultaneously bending a series of cover retaining fingers into concealed position behind the cover, the apparatus comprising a supporting die having a peripheral formation approaching to within a short distance of the outer marginal extremity of the cover member and shaped to receive the portion of the cover member radially inwardly from said marginal extremity in closely conforming relation, and curling die mechanism cooperative with said supporting die to form the bead and simultaneously bend said retaining fingers into concealed position behind the cover, said supporting die peripheral portions having sections thereof cut out to provide clearance for the inward swinging of the fingers as they are bent into their ultimate position behind the cover member.

Other objects, features and advantages of the present invention will be readily apparent from the following detailed description of a preferred embodiment thereof taken in conjunction with the accompanying drawings, in which:

Figure 1 is a side elevational view of a vehicle wheel having thereon a cover made according to the present invention;

Figure 2 is an enlarged radial sectional view taken substantially on the line II—II of Figure 1;

Figure 3 is a fragmentary rear elevational view of the trim ring component of the cover;

Figure 4 is a diametrical sectional view through the trim ring component showing the same in a state of partial completion;

Figure 5 is a diametrical sectional view of the trim ring component substantially the same as Figure 4 and showing the same in the apparatus for completing the fabrication thereof; and Figure 6 is a sectional view similar to Figure 5 but showing the forming apparatus at the moment of completion of fabrication therein of the trim ring component.

A wheel cover of the type with which the present invention is concerned comprises a hub cap component 15 and a trim ring component 17 (Figs. 1 and 2). The assembly is adapted to be applied to a vehicle wheel which includes a load sustaining wheel body 18 supporting a tire rim 19 which in turn is adapted to support a pneumatic tire and tube assembly 20.

The wheel body 18 may be of the kind described in my Patent No. 2,445,330, issued July 20, 1948, and includes an intermediate annular axially outwardly protruding reinforcing nose bulge 21 defining a central bolt-on flange 22 and formed with a radially outwardly facing annular shoulder 23 which is provided at predetermined annularly spaced points with radially outwardly protruding cover retaining bumps 24.

The hub cap member 15 is provided at its margin with a generally axially extending marginal flange 25 which is of greater internal diameter than the major circle described by the tips of the retaining bumps 24. The inner extremity of the marginal flange 25 is formed with a reinforcing inturned bead 27 which is of a slightly smaller inner diameter than the minimum circle described about bumps 24, that is at the axially inner sides of the bumps where they dip radially inwardly to afford a retaining overhang, but said inner diameter of the bead is larger than the maximum diameter of the shoulder 23. A secure resilient snap-on pry-off relation is attained by pressing the hub cap 15 axially inwardly to force the bead 27 over the retaining bumps 24.

The tire rim 19 is of the conventional drop center type having a plurality of stepped flanges including an intermediate generally axially outwardly and slightly radially outwardly slanting intermediate flange 29 and a generally radially outwardly and axially outwardly turned terminal flange 30.

The trim ring component 17 is dimensioned and shaped to substantially cover the tire rim 19 and the adjacent portion of the wheel body 18 substantially to the shoulder 23. To this end, the trim ring member 17 is formed of generally arcuate channel shape to dip annularly into the relatively large outwardly opening annular groove present between the wheel body 18 and the tire rim 19. At its outer margin the trim ring member 17 is formed with an underturned edge defining a hollow reinforcing and finishing bead 31 which is adapted to rest against the shoulder at the juncture between the tire rim flanges 29 and 30 in assembly of the trim ring with the tire rim.

For retaining the trim ring 17 on the wheel, a plurality of retaining fingers 32 is formed at the outer margin of the trim ring, herein as integral extensions of the outer edge which is turned under in the bead 31. Herein the fingers 32 are formed as a plurality of narrow elongated projections comprising a series of predetermined number in a group and a plurality of groups, such as four groups equidistantly spaced about the margin of the trim ring are provided. Each of the fingers 32 includes a body extension 33 which lies against the inner surface of the trim ring, and projects generally radially and axially inwardly, and a retaining, wedging, biting finger terminal 34 which extends from the inner end of the body portion 33 in a generally radially outwardly and axially outwardly slanting direction and in assembly with the wheel enters into wedging, biting engagement with the tire rim intermediate flange 29.

At its radially inner margin, the trim ring member 17 is formed with a flattened radially inwardly extending margin 35 having an inner diameter which will clear the cover retaining bumps 24 but which is less than the outward diameter of the hub cap marginal flange 25. The inner marginal flange 35 of the trim ring is adapted in assembly to lie against the wheel body 18 radially spaced from the shoulder 23 and with the margin 25 of the hub cap 15 overlapping the flange 35 to conceal the juncture of the hub cap with the trim ring, and also to hold the inner marginal flange 35 tightly in place against rattling. Since the trim ring flange 35 bears against the wheel body 18, a pry-off tool inserted between the flange 35 and the hub cap bead 27 for dislodging the hub cap 15 will have no detrimental or damaging effect upon the flange 35.

Intermediate the outer marginal turned edge or rib 31 and the inner marginal flanges 35 there is provided a principal body portion 37 of dished, concave cross-section.

In making the trim ring 17, certain preliminary steps involved in the shaping of a sheet metal blank in the formation of the trim ring have been omitted from the present application as unnecessary. However, as shown in Fig. 4, in a partially completed form, the trim ring 17 has the bead portion 31 fairly open and the finger extensions 33 extending axially inwardly relative to the outer face of the trim ring and substantially spaced from the adjacent area of the dished body portion 37.

Then, the open bead portion 31 is curled inwardly and the finger extensions 33 are bent back toward substantially abutting relation to the adjacent convex surface of the trim ring body 37. This is accomplished in apparatus as shown in Figs. 5 and 6 including a supporting or anvil die member 40 mounted on a base 41 and adapted to support the partially completed trim ring 17, a hold down die 42 for holding the trim ring in place on the anvil die 40, and a curling die member 43 by which curling of the bead is completed. The anvil die may be in ring form as shown and has the trim ring supporting surface thereof contoured as shown at 44 to engage the inner side of the trim ring in close conformity, with an outer marginal ridge 45 terminating short of the ultimate axially inward extent of the finished edge bead 31.

The hold down die member 32 may also be of ring form and has a trim ring engaging surface 47 which is complementary to and closely engages the outer surface of the trim ring and clamps the trim ring against the anvil die member 40. At its outer periphery 48 the hold down die ring 42 is of a diameter slightly greater than the original diameter described by the radially inner side of the bend 31 as it is originally formed and wherein the partially formed bead has a substantially cylindrical inner side wall W (Fig. 4). Thereby, when the hold down die 42 is driven tight against the trim ring seated on the anvil die 40, the inner wall portion W of the bead rib is ironed into the curved contour of the trim ring body 38 by the complementary surface 47 of the hold down die.

The curling die member 43 is preferably in the form of a ring slidably encircling the hold down die outer side wall 48. A supporting ring 49 carries the curling die ring 43 and also supports the hold down die ring 42. Relative movement between the hold down die ring 42 and the curling die ring 43 is permitted by attaching the hold down die ring 42 to the supporting ring 49 through the medium of pins 50 which are slidable in appropriate bores 51 in the ring 49 and have a length to permit projection of the hold down ring 42 into spaced relation to the supporting ring 49 under the influence of compression springs 52. Respective heads 53 on the pins 50 are engageable with the top of the supporting ring 49 to limit the distance to which the hold down ring may move into spaced relation to the supporting ring 49. Respective bores 54 afford clearance for the pin heads 53 in a ram member 55 which carries the supporting ring 49.

After the partially formed trim ring 17 has been placed in the die assembly, in centered relation on the supporting or anvil ring 40 as shown in Fig. 5, the ram 55 is driven toward the anvil ring and the hold down ring die 42 enters into hold down engagement with the trim ring and acts to iron out the inner wall W of the outer peripheral bead rib of the trim ring. In the further movement of the ram 55, the clearance between the supporting ring 49 and the hold down ring 42 is reduced to the extent necessary for the curling die ring 43 to enter into bead curling engagement with the turned edge 31. The curling ring has a curling groove 57 in its lower curling face adjacent to its inner wall and in effect merging with the forming surface of the hold down die 42. As the curling surface defining the groove 57 in the die ring 43 applies curling pressure to the turned edge 31, the supporting or anvil ring 40 and more particularly the peripheral ridge 45 thereof supports the engaged portion of the body 37 of the trim ring member 17 against downward buckling and the surface 47 of the hold down die ring 42 holds the trim ring against inward buckling and the turned edge is turned down upon itself and the outer wall portion thereof is curled inwardly.

As an incident to curling of the bead 31, the cover retaining extension tabs or fingers 32 are swung inwardly to their permanent operative position in substantial engagement with the body portion 37 of the trim ring, as seen in Fig. 6. At this time, also, the inner side of the bead is tilted in generally radially outward direction and generally toward the finger tabs, as is clearly evident on comparison of Fig. 6 with Fig. 5. This moves the complete bead radially outwardly into substantially concealing relation to the retaining fingers 32.

Clearance for the fingers 32 as they are swung inwardly is afforded by appropriate clearance spaces, cut out sections or notches 58 in the supporting or anvil die ridge 45. Thereby the major extent of the outer margin of the trim ring inwardly from the bead 31 is supported by the anvil die ring 40 but freedom for inward swinging of the fingers 32 to the diagonal slanting position finally assumed thereby is amply accommodated.

After the bead 31 has been completed and the fingers 32 swung into their permanent position, the trim ring is released from the beading and finger positioning die assembly and may be subjected to a sizing die as is conventional practice in beading operations.

After the hub cap and trim ring members have been completed, they may be provided with suitable external finish as desired.

It will be understood that modifications and variations may be effected without departing from the scope of the novel concepts of the present invention.

I claim as my invention:

1. In a forming die assembly for vehicle wheel covers, a supporting die for underlying a wheel cover blank and having a ring-shaped upwardly facing element provided with an upwardly facing contoured cover receiving surface and an annular outer peripheral upwardly directed rib with portions thereof at spaced intervals recessed and providing upwardly and outwardly opening clearances interrupting the peripheral continuity of the rib, a hold-down ring member reciprocably cooperative with said supporting ring member to clamp a cover blank between the rings, and a third ring die member relatively reciprocably related to both of said first mentioned ring members and operative upon an upstanding marginal hollow downwardly opening rib having an outer margin with downwardly extending finger extensions on the cover blank and with the cover rib overlying said die rib in upwardly spaced relation, said third ring die member having a continuous annular curling groove within which the cover blank rib is engaged for turning the outer margin of said cover blank rib inwardly under the cover blank rib and for swinging the downwardly extending finger extensions on said outer margin into said clearance recesses while the die rib intermediate said recesses supports the cover blank solidly during action of said third ring die member.

2. In apparatus for making wheel covers, a die bed carrying thereon an upwardly facing supporting die ring for reception thereon of a wheel cover blank with an upstanding peripheral rib and downwardly projecting finger extensions on the outer margin of the rib, the outer upper marginal portion of said supporting die ring comprising an upwardly directed rib for underlying the inner side of said cover blank rib in spaced relation and having radially outwardly opening recessed clearances for reception of said fingers, and a ram assembly including a resiliently supported holddown ring cooperable with said supporting die ring to clamp the cover blank therebetween and a fixed shaping die ring about the outer periphery of said holddown ring and having a continuous annular curling surface engageable sequentially thereafter with the upstanding marginal rib of the cover blank to operate thereon for turning the outer margin of the cover blank rib under and inwardly relative to the top of the cover blank rib and to move said finger extensions into said recesses.

References Cited in the file of this patent

UNITED STATES PATENTS

| | | |
|---|---|---|
| 1,590,749 | Hulbert | June 29, 1926 |
| 1,597,978 | Hulbert | Aug. 31, 1926 |
| 2,089,518 | Williams | Aug. 10, 1937 |
| 2,162,734 | Lyon | June 20, 1939 |

FOREIGN PATENTS

| | | |
|---|---|---|
| 435,784 | Great Britain | Sept. 27, 1935 |